United States Patent
Appler et al.

(10) Patent No.: US 10,514,190 B2
(45) Date of Patent: Dec. 24, 2019

(54) ADDITIVE COMPOSITION FOR IMPROVEMENT OF MISCIBILITY OF LUBRICANTS IN AIR-CONDITIONING AND REFRIGERATION SYSTEMS

(71) Applicant: Alltemp Products Company Limited, Pickering (CA)

(72) Inventors: Paul Appler, Windsor (CA); George E. Cranton, London (CA); Norma Hill, Windsor (CA); Jesse Homenuik, Windsor (CA)

(73) Assignee: Alltemp Products Company Limited, Pickering, Ontario (CA)

( * ) Notice: Subject to any disclaimer, the term of this patent is extended or adjusted under 35 U.S.C. 154(b) by 60 days.

(21) Appl. No.: 15/300,650

(22) PCT Filed: Apr. 2, 2015

(86) PCT No.: PCT/CA2015/000224
§ 371 (c)(1),
(2) Date: Sep. 29, 2016

(87) PCT Pub. No.: WO2015/149157
PCT Pub. Date: Oct. 8, 2015

(65) Prior Publication Data
US 2017/0211860 A1 Jul. 27, 2017

Related U.S. Application Data

(60) Provisional application No. 61/975,468, filed on Apr. 4, 2014.

(51) Int. Cl.
| | |
|---|---|
| *F25B 45/00* | (2006.01) |
| *F16N 3/04* | (2006.01) |
| *F25B 47/00* | (2006.01) |
| *F25B 31/00* | (2006.01) |
| *C10M 101/02* | (2006.01) |
| *C10M 105/06* | (2006.01) |
| *C10M 105/38* | (2006.01) |
| *C10M 129/16* | (2006.01) |
| *C10M 133/12* | (2006.01) |
| *C10M 171/00* | (2006.01) |

(52) U.S. Cl.
CPC ........... *F25B 45/00* (2013.01); *C10M 101/02* (2013.01); *C10M 105/06* (2013.01); *C10M 105/38* (2013.01); *C10M 129/16* (2013.01); *C10M 133/12* (2013.01); *C10M 171/008* (2013.01); *F16N 3/04* (2013.01); *F25B 31/002* (2013.01); *F25B 47/00* (2013.01); *C10M 2203/003* (2013.01); *C10M 2203/065* (2013.01); *C10M 2203/1006* (2013.01); *C10M 2205/028* (2013.01); *C10M 2207/04* (2013.01); *C10M 2207/042* (2013.01); *C10M 2207/127* (2013.01); *C10M 2207/283* (2013.01); *C10M 2207/2835* (2013.01); *C10M 2209/1033* (2013.01); *C10M 2215/065* (2013.01); *C10M 2215/14* (2013.01); *C10M 2215/223* (2013.01); *C10M 2219/046* (2013.01); *C10M 2223/04* (2013.01); *C10N 2220/302* (2013.01); *C10N 2230/06* (2013.01); *C10N 2230/10* (2013.01); *C10N 2230/12* (2013.01); *C10N 2230/14* (2013.01); *C10N 2240/30* (2013.01); *F25B 2500/16* (2013.01)

(58) Field of Classification Search
CPC .... F25B 45/00; F25B 31/002; F25B 2500/16; F25B 2500/2835; F16N 3/04; C10M 105/38; C10M 133/12; C10M 171/008; C10M 101/02; C10M 129/16; C10M 105/06; C10M 2207/2835; C10M 2215/065; C10M 2203/003; C10M 2203/065; C10M 2207/04; C10N 2240/30; C10N 2230/10; C10N 2230/12; C10N 2230/14; C10N 2230/06; C10N 2040/30; C10N 2030/00
USPC ....................................... 252/68, 69
See application file for complete search history.

(56) References Cited

U.S. PATENT DOCUMENTS

| | | | |
|---|---|---|---|
| 5,813,240 A | 9/1998 | Sato et al. | |
| 6,516,837 B2* | 2/2003 | Thomas ................ | C09K 5/045 141/65 |
| 6,526,764 B1 | 3/2003 | Singh et al. | |
| 7,077,149 B2 | 7/2006 | Kalley et al. | |
| 2004/0069970 A1* | 4/2004 | Goble ................... | B01D 3/007 252/67 |
| 2005/0268642 A1* | 12/2005 | Appler .............. | B60H 1/00585 62/468 |
| 2007/0187639 A1 | 8/2007 | Leck et al. | |
| 2009/0267019 A1 | 10/2009 | Yana Motta et al. | |
| 2011/0167841 A1 | 7/2011 | Appler et al. | |
| 2012/0145946 A1 | 6/2012 | Minor | |
| 2012/0223269 A1 | 9/2012 | Van Horn et al. | |

OTHER PUBLICATIONS

Canada Office Action dated Nov. 1, 2017 in related application No. 2,944,662 filed Apr. 2, 2015 3 pgs.
International Search Report and Written Opinion dated Jul. 8, 2015 in related application No. PCT/CA15/00224 filed Apr. 2, 2015 9 pgs.

* cited by examiner

*Primary Examiner* — Douglas J McGinty
(74) *Attorney, Agent, or Firm* — Dentons US LLP

(57) ABSTRACT

A lubricant additive for introduction into a AC/R system to improve lubricant miscibility and performance in the AC/R system.

18 Claims, 4 Drawing Sheets

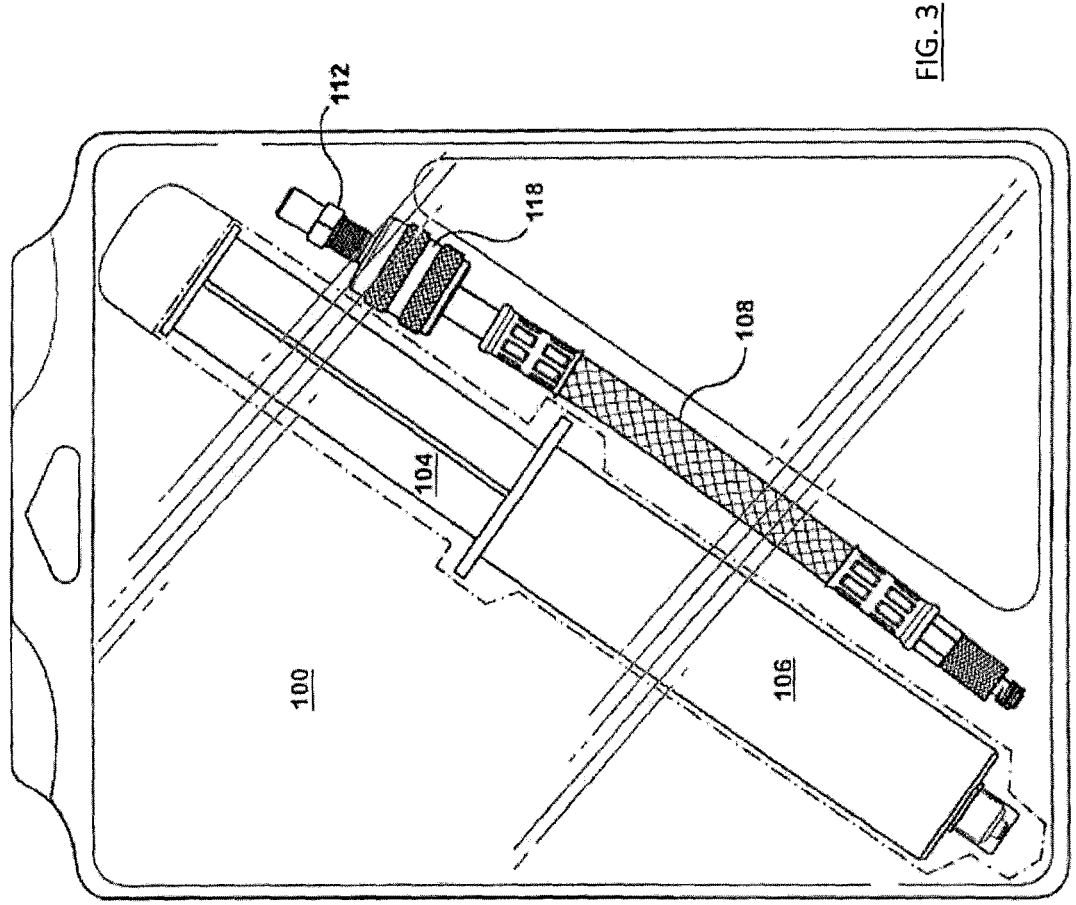

ADDITIVE COMPOSITION FOR IMPROVEMENT OF MISCIBILITY OF LUBRICANTS IN AIR-CONDITIONING AND REFRIGERATION SYSTEMS

This application claims the benefit of and priority to U.S. Patent Application No. 61/975,468 filed Apr. 4, 2014, the contents of which are incorporated herein by reference.

BACKGROUND

This disclosure relates to lubricants in air-conditioning and refrigeration (AC/R) systems, and in particular to an additive composition for conditioning lubricants pre-existing in such AC/R systems.

Hydrofluorocarbon (HFC) refrigerants are now often used to replace legacy hydrochlorocarbon (HCC) and hydrochlorofluorocarbon (HCFC) refrigerants in existing AC/R systems. However, such a change over often requires additional component upgrades or results in reduced system performance.

In an ideal situation, a drop-in refrigerant would replace an HCFC refrigerant such as R-22 directly with no change to existing components or equipment or the operating efficiencies of the AC/R system. Current replacement refrigerants include retrofit replacement refrigerants which require a change out of one or more AC/R system components such as elastomeric seals, filter driers, metering devices and oil. For example, HFC R-410A, which is a retrofit replacement refrigerant for R22, requires a condenser unit change. Refrigeration systems operating with R-410A operate at higher pressures and the compressor requires a thicker shell wall than when R-22 is used. A metering device change is also required and a change in the evaporator coil is also recommended when changing to R-410A.

Current replacement refrigerants also include refrigerants intended for drop-in such as the HFC mixture R-421A, which can replace HCFC R-22 without any retrofits but can result in lower efficiency depending on factors such as high ambient operating conditions and systems overall performance due to piping arrangements, or heat exchange of the condenser and evaporator coils as it pertains to refrigerant flow and air exchange.

Other drop-in refrigerants such as R-417a and R-422a contain a small amount of hydrocarbon (butane or isobutene) to allow continued use of existing mineral or alkylbenzene oils in the system. The hydrocarbon in the refrigerant is intended to improve oil return back to the compressor by reducing oil viscosity. Using only a low concentration of hydrocarbon ensures the refrigerant remains non-flammable. In fact, the small amount of hydrocarbon actually contributes to lower oil return, resulting in oil logging and reduced heat transfer. It is well established that retrofit refrigerants result in reduced system capacity, increased energy usage, and failure to meet load demands at higher ambient temperatures.

When changing to a replacement refrigerant, an important factor to consider is the choice of compressor lubricant oil. HCFC refrigerants such as R-22 use compressor oils based on the use of hydrocarbon bases, namely mineral oil or alkyl benzenes. However, these lubricants are not sufficiently miscible with HFC refrigerants. Miscibility between refrigerant and lubricant is required to return entrained lubricant from system lines back to the compressor to ensure adequate ongoing lubrication. The change to HFC refrigerants therefore requires also a change-out of lubricant from these immiscible lubricants to lubricants such as the polyol esters which are miscible with an HFC refrigerant such as R-134a.

As a result of the above considerations, typical refrigerant change procedures involve one or more additional steps of replacing the existing condenser and evaporator, draining lubricant and then flushing the existing refrigeration system line sets with solvent to remove any residual mineral or alkyl benzene oils. Solvent flushes require high pressure nitrogen purges as a final further step to remove the remaining solvent flush from the refrigeration system lines.

SUMMARY

According to one example embodiment there is provided a device comprising a container containing a lubricant additive composition for injection into a air-conditioning or refrigeration (AC/R) system and connector configured to couple the container to a service port of the AC/R system to introduce the lubricant additive into the AC/R system, the lubricant additive composition comprising one or more miscibility agents to improve lubricant miscibility between an HFC refrigerant and a mineral oil lubricant or an alkyl benzene lubricant. In addition the additive may contain other components to enhance performance in resistance to thermal breakdown, anti-wear, anticorrosion, water removal and such.

According to another example embodiment, is a method for improving the miscibility of an HFC refrigerant and a mineral oil or an alkyl benzene lubricant in an AC/R system, comprising: adding a lubricant additive composition independently of an HFC refrigerant into an AC/system that contains an HFC refrigerant and at least one of a mineral oil lubricant or an alkyl benzene lubricant, the lubricant additive composition comprising a miscibility agent.

BRIEF DESCRIPTION OF DRAWINGS

Reference will now be made, by way of example, to the accompanying drawings which show example embodiments of the present description, and in which:

FIGS. 3 to 5 are views of an alternative delivery system for an AC/R system additive composition according to an example embodiment.

DESCRIPTION

Figure 2:
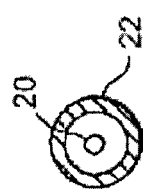
FIG. 2 is an end view of a fitting of the delivery system of FIG. 1.

There is a need for alternatives to the current requirement to change the mineral oil or alkyl benzene refrigeration oil when installing drop-in or retrofit replacement HFC refrigerants. In this regard, a lubricant additive composition is described herein which may in at least some embodiments be used when hydrofluorocarbon (HFC) refrigerants are used to replace hydrochlorocarbon (HCC) and hydrochlorofluorocarbon (HCFC) refrigerants in existing AC/R systems. In at least some embodiments such an additive is aimed particularly at improving miscibility of mineral oil or alkyl benzene lubricants with replacement hydrofluorocarbon refrigerants. An easily injected additive would be particularly attractive. This could be done as a separate activity or during system maintenance when equipment is low on refrigerant due to system leaks that require replacement of the condenser, evaporator, expansion valve or refrigerant drier. An additive approach to avoiding lubricant change-out would also be attractive when the AC/R system and piping are difficult to access making a system replacement uneconomical. Also, the solvent flush and nitrogen purge required to remove pre-existing lubricants from the system could be avoided.

Miscibility of chemical components can be described using the concept of solubility parameters. In particular, Hansen (Charles M. Hansen. Hansen solubility parameters: a user's handbook. CRC Press. (2000)) has described the use of three such parameters that can be combined into an overall parameter. The three parameters are those that describe interactions between molecules in terms of dispersion, polarity and hydrogen bonding. In broad terms, molecules which interact most strongly in these areas tend to be more miscible. Inoue and Iwamoto (K. Inoue, A. Iwamoto. Sekiyu Gakkaishi, 35(1), 76-83 (1992)) have shown that the hydrogen bonding is of particular importance in the interaction between R-134a HFC refrigerant and polyester lubricants. Additives with similar dispersion and polar solubility parameters to mineral oil and alkyl benzenes and also with a strong hydrogen bonding component could, in some applications, be effective additives for the purpose of improving miscibility of these refrigerants and lubricants.

The present disclosure describes the composition of a lubricant additive which in at least some applications improves the miscibility of mineral oil or alkyl benzene lubricants with hydrofluorocarbon refrigerants, and also describes systems for injecting the additive into AC/R systems. In at least some applications, the additive described herein may also be applied to AC/R systems that include lubricants other than mineral oil or alkyl benzene to remove moisture or oxidizing elements from the lubricant as well as provide enhanced miscibility of refrigerant and lubricant.

In an example embodiment, lubricant additives to improve miscibility between hydrofluorocarbon (HFC) refrigerants and mineral oil lubricants include other refrigeration lubricant types which have an intermediate or strong miscibility with HFC refrigerants while having some miscibility with mineral oils. In particular examples, such additives include polyolester and alkyl benzene types but also may include other selected lubricants. In other example embodiments, additives or additive mixtures will be those that impart polar and hydrogen bonding characteristics to the mixture. Glycols and alcohols or their mixtures are particularly attractive for this purpose.

Since these lubricant additives will often be aimed at use in older refrigeration systems, in at least some example embodiments the lubricant additive will include further additive components to improve performance in other areas. These other components could include one or more of an antioxidant or thermal stabilizer, anticorrosion additive, metal deactivator, acid neutralizer, or antiwear additives.

Hydrolytic agents to remove water from the system can also be included in the lubricant additive. Orthoesters are particularly attractive since they can also act as miscibility agents either in the unreacted form or in their reacted form as the alcohol reaction product. In particular, hydrolytic agents such as orthoesters, including triethylorthoformate, remove water by reacting to form alcohols which are themselves miscibility agents.

Particularly for older systems, the inclusion of a fluorescent leak detection dye as a component in the additive is attractive. A non-fluorescent colorant or tint (for example a blue colorant) can also be included in the additive to allow the composition to be easily seen as it passes through a hose or is stored in a container.

Injection or introduction of the lubricant additive into the AC/R system can be effected by any one of a number of alternatives, as will be described in greater detail below.

According to one example embodiment there is provided a lubricant additive for injection into an AC/R system to improve lubricant miscibility and performance in which the AC/R system has been or is being converted from use of another refrigerant type to use of an HFC refrigerant and in which the AC/R system contains a mineral oil lubricant. In an example embodiment, the lubricant additive contains a polyolester refrigeration lubricant. The additive may also include one or more of a hydrolytic agent, a fluorescent dye, a visible colorant, a performance enhancing agent (including one or more of an antioxidant or thermal stabilizer, anticorrosion additive, metal deactivator, acid neutralizer, and anti-wear additives) and a miscibility agent. In a composition in which the additive includes a hydrolytic agent, the hydrolytic agent could include one or more of an orthoester, acetal, epoxide or carbodiimide. The orthoester could for example be triethylorthoformate.

In an additive that includes an antioxidant or thermal stabilizer, the antioxidant or thermal stabilizer could be a phenol or phenyl-alphanaphthylamine. In an example embodiment of a composition where the additive includes an anticorrosion additive, the anticorrosion additive is an alkenyl succinic acid derivative. Alternatively, the anticorrosion additive can be a phosphate ester.

An example of a metal deactivator that could be included in the lubricant additive is a tolutriazole. Examples of an acid neutralizer that could be included in the lubricant additive include one or more of a metal alkoxide, carbodiimide, glycidyl ether, epoxide, alkanolamine, arylamine, overbased metal sulphonates or an inorganic base. An inorganic base could for example be KOH.

In an example embodiment in which the lubricant additive includes a miscibility agent, the miscibility agent includes one or more of an alkylbenzene, polyalphaolefin or polyalkylene glycol refrigeration lubricating oil. Alternatively, the miscibility agent is one or more of (a) an alcohol, including but not limited to methanol, ethanol, propanol, diols including butanediols and aromatic alcohols including the benzenediols; (b) a glycol including glycerol, ethylene glycol, diethylene glycol and propylene glycol (c) an amine; (d) an amide; and (e) a liquid or gaseous hydrocarbon.

As noted above, the lubricant additive is configured to be added to an existing AC/R system in at least some applications. As known in art, a typical hermetically sealed AC/R system has an evaporator, compressor, condenser and expansion device. The AC/R system has a "low side" consisting of the part of the system between the expansion device and the suction line to the compressor. The compressor draws in low pressure, low temperature refrigerant in a gaseous state from the "low side". The compressor compresses the gaseous refrigerant to a high pressure, high temperature gaseous state that flows to the condenser. The refrigerant passes through the condenser and is cooled to a liquid state. The liquid refrigerant passes through the expansion valve, which causes the refrigerant to expand to a low pressure temperature gas. The evaporator absorbs heat from outside the system, and relatively low temperature, low pressure gas is reintroduced to the compressor. AC/R systems typically have a service port at the low side that includes a valve fitting to allow fluid to be introduced to the AC/R system as part of maintenance or servicing. AC/R systems may also have a service port at the high side.

As suggested above, in at some example embodiments, the lubricant additive composition described herein can be introduced into an AC/R system without requiring the AC/R system to be drained or flushed of existing fluids, or disassembled to change mechanical components. In this regard, in some example embodiments the lubricant additive is packaged in a container that is configured to be attached to a service port of the AC/R system. One example method for introducing the lubricant additive to an AC/R system can include the following:

- The AC/R compressor is turned off or otherwise put into a "service mode";
- A discharge fitting of a container that contains the lubricant additive is coupled to the low side (low pressure) service port of the AC/R system;
- The compressor is tuned on or otherwise put into an "operational mode"; and
- Once the lubricant additive empties from its container into the AC/R system, the container is decoupled from the low pressure service port.

In one example embodiment, the lubricant additive composition for improving miscibility and performance of the refrigeration or air-conditioning system is pre-packaged in a container or can. The can may be (a) vacuum-packed to facilitate additive injection into the cooing system using system pressure or (b) pressurized with a nitrogen, carbon dioxide or gaseous hydrocarbon or a refrigerant to facilitate additive injection into the AC/R system. In some example embodiments the can or container is part of an additive kit that also includes instructions for use and a hose to facilitate attachment of the can to an AC/R system.

Figure 1:
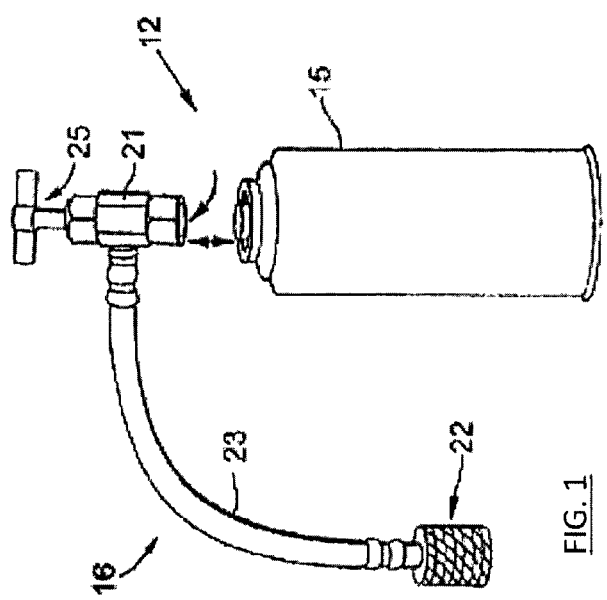
FIG. 1 is perspective view of a delivery system for an AC/R system additive composition according to an example embodiment.

By way of example, FIG. 1 illustrates one example of a device 12 for introducing a lubricant additive composition into an AC/R system. The device 12 includes a sealed vessel or container 15 containing a lubricant additive composition according to one of the embodiments described herein, and a coupling assembly 16 for connecting the container 15 to a service port of the AC/R system. Coupling assembly 16 includes a flexible hose 23 that has a low-loss valve fitting 22 at one end and a can-tapper 21 at the opposite end. The can-tapper 21 has a manually operated valve (see valve handle 25 below) for fluid connection (open) and fluid disconnection (closed) of the canister 15 from the system 1. It also has a tapping pin for unsealing the canister 15. The can-tapper 21 is also a fitting for sealed fluid connection to the canister 15, typically by way of compatible threads in the can-tapper and on the canister 15, and corresponding seals, such as a rubber gasket or an o-ring. Fitting 22 includes a orifice 20 (see FIG. 2) sized to provide a predetermined flow rate, In another example embodiment, the lubricant additive composition for improving miscibility and performance of the refrigeration or air-conditioning system is pre-packaged in a syringe style injector. In some example embodiments the pre-filled syringe style injector is part of an additive kit that also includes instructions for use and a hose to facilitate attachment of the injector to a AC/R system.

In this regard, FIG. 3 illustrates an example of a kit 100 that contains such a device 102 contained within transparent plastic packaging 110. In an example embodiment, the device 102 includes a syringe 104 that is pre-filled with a lubricant additive composition 106, and a delivery hose coupling assembly 108. In the example embodiment, the components of the device 102 are contained within packaging 110 with the connector hose 108 detached from the pre-filled syringe 104. Instructions for use of the device 102 may be applied to or contained within the packaging 110. In example embodiments, a bleed fitting 112 is also enclosed in packaging 110.

Figure 4:
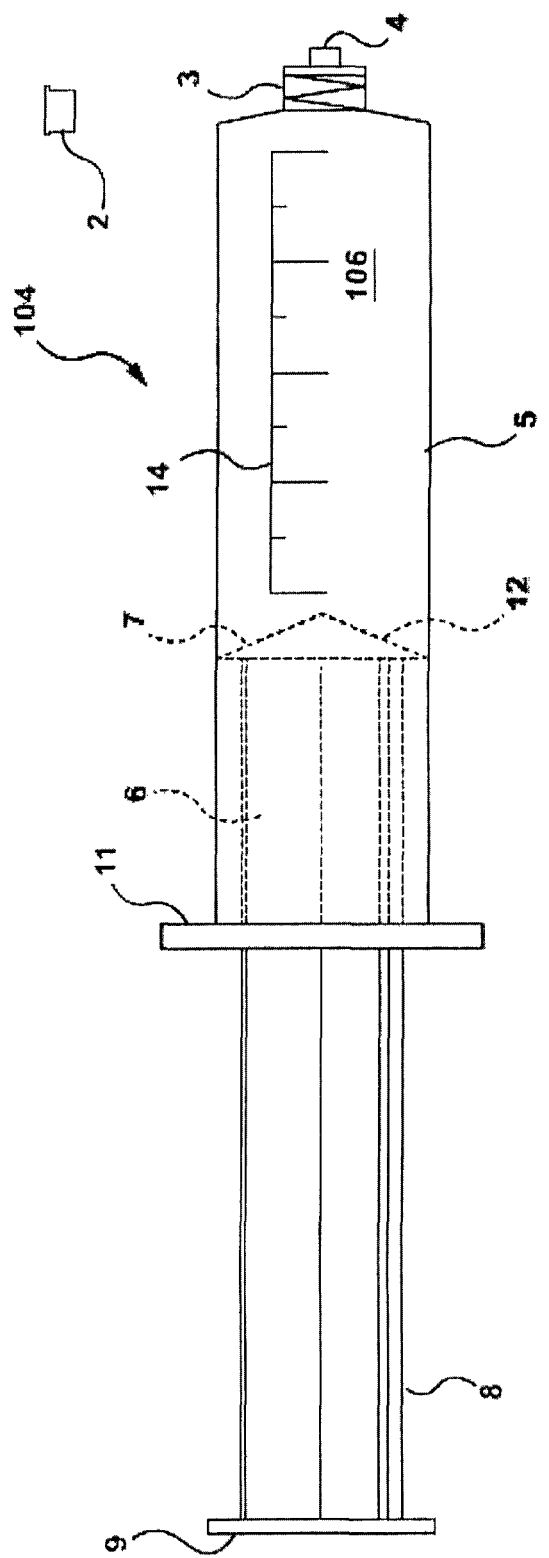

Referring to FIG. 4, in an example embodiment, the syringe 104 is a two-part syringe that includes a barrel 5 and a plunger 8. The barrel 5 defines an internal chamber, which as noted above is pre-filled with additive composition 106 to a predetermined fill level 12. The barrel 5 includes an open end that receives a forward end of the plunger 8 and that is provided with one or more radially extending finger grips 11. The forward discharge end of the plunger 8 includes a nozzle 4 that defines a nozzle lumen. In an example embodiment, the nozzle 4 is externally threaded to provide a Luer lock fitting 3. In example embodiments, the barrel 5 is translucent or transparent and includes graduated markings 14 to provide a visual indication of changes in volume of fluid 106 contained within the barrel 5. A removable cap 2 may be provided for covering the nozzle 4.

The plunger 8 includes a push-button interface 9 for pushing a piston 6 of the plunger 8 into the barrel 5, and the opposite end of the plunger 8 includes one or more seals 7 on the piston 6 that engage the interior wall of the barrel 5. In an example embodiment the seal 7 is integrally formed with and from the same material as the rest of the plunger 8. In one example, the plunger 8, including seal 7, is formed from is Polyethylene (PE) and the barrel 5 is formed from transparent Polypropylene (PP). By way of non-limiting example, in some applications a suitable syringe may be the disposable HSW NORM-JECT™ 50 ml (60 ml) Luer Lock 2-part syringe.

As noted above, in example embodiments, the one or more seals 7 provided on the plunger 8 are formed from the same material (PE) as the rest of the plunger. In at least some applications, such a unitary construction can improve the storage life of the reactive fluid filled syringe as the seals 7 may be less prone to breakdown. However, in at least some example embodiments, the seals 7 may be made from elastomeric material that is mounted on the plunger piston 6 rather than integrally formed with the piston 6—for example seals 7 could be elastomeric o-ring seals.

Figure 5:
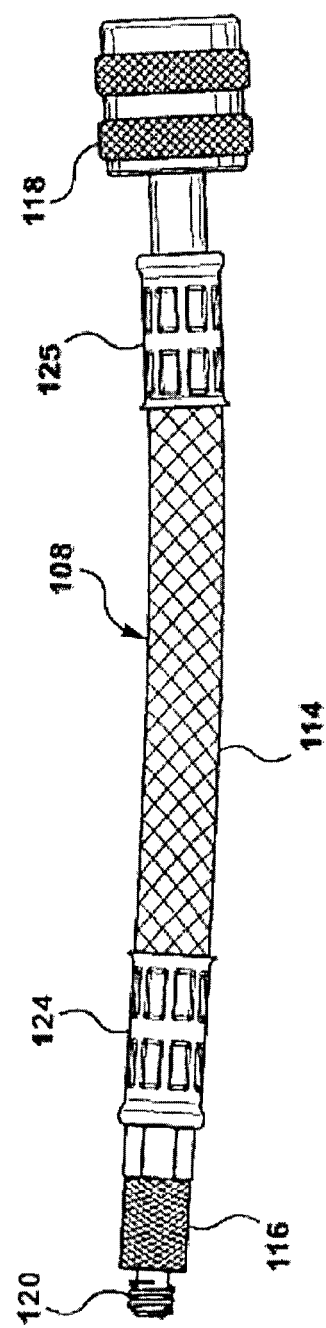

As shown in FIG. 5, connector hose coupling assembly 108 includes a central section formed from transparent or translucent flexible tubing 114 that is reinforced with fiber braiding. Connector hose 108 includes a syringe fitting 116 at one end of tubing 114 for connecting the hose 108 to the lock fitting 3 of syringe 104, and a discharge fitting 118 at the other end of tubing 114 for connecting the hose 108 to an AC/R system. The syringe fitting 116 includes an externally threaded Luer lock connector 120 for engaging the corresponding internally threaded Luer lock fitting 3 provided on syringe nozzle 4. A crimp fastener 124 is used to secure the fitting 116 in place on tube 114. In an example embodiment, the syringe fitting 116 includes a check valve so that fluid can move from the syringe 104 into the hose tubing 114, but not in the reverse direction.

Referring to FIG. 5, the discharge fitting 118 is a low loss fitting that is configured to connect to the service port of an AC/R system. In this regard, the discharge fitting 118 can be a conventional low loss fitting that threads onto a conventional service port that includes an valve mechanism that cooperates with the service port. A crimp clamp 125 can be used to secure the fitting 118 to hose tube 114. The clear or translucent nature of hose tube 114 allows visual confirmation of when composition 106 is present within the connector hose 108. Bleeder fitting 112 can be attached to the discharge connector 118 of connector hose 108 to allow for purging air from the device 102 prior to connection to an AC/R system.

In one example embodiment, the lubricant additive composition for improving miscibility and performance of the refrigeration or air-conditioning system is located in a flexible expanding hose or tube that is sealed at one end and at the other end includes a two-way flow fitting that can be attached to the refrigeration or air-conditioning system. In some example embodiments the hose is part of an additive kit that also includes instructions for use.

Figure 6:
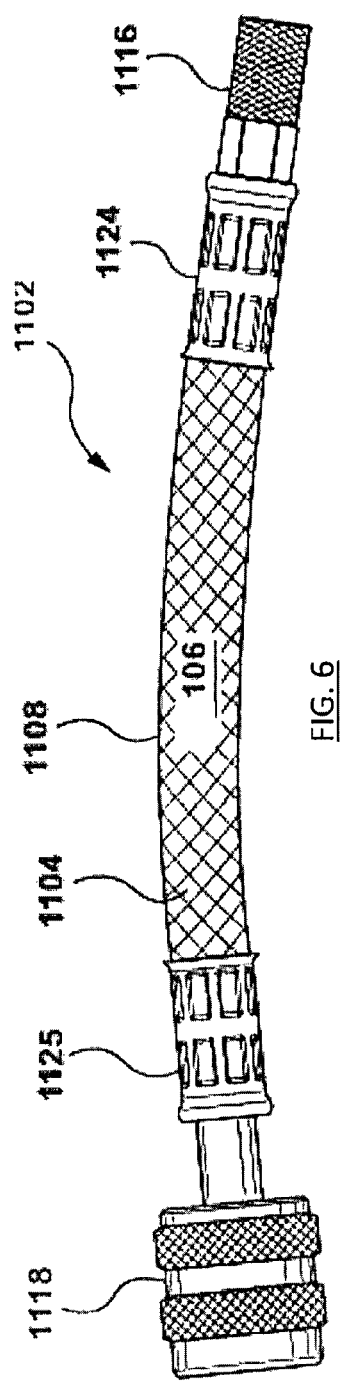
FIG. 6 is a view of a further alternative delivery system for an AC/R system additive composition according to another example embodiment.

In this regard, FIG. 6 illustrates an example of a fluid storage and introducing device 1102 pre-filled with a additive composition 106. In one example embodiment, the device 1102 includes a fluid storage container 1104 that defines a fluid storage reservoir. The container 1104 can be a unitary piece of resilient flexible tubing 1108 that is formed from transparent or translucent elastomer or plastic or other polymer tubing reinforced with fiber braiding. In some example embodiments, tubing 1108 may not be reinforced with fiber braiding, and in some embodiments it may be opaque rather than transparent. The device 1102 includes a bleed valve fitting 1116 at one end of tubing 1108 and a coupling assembly in the form of discharge/fill fitting 1118 at the other end of the tubing 1108 for connecting the device 1102 to a fluid filling station and to an AC/R system, respectively. In an example embodiment, the fill/discharge fitting 1118 is a female low loss fitting that is configured to connect to a service port of an air conditioning or refrigerant system. In this regard, the fill/discharge fitting 1118 can be a conventional low loss fitting configured to thread onto a conventional service port, and which includes a normally closed valve mechanism that cooperates with the service port. A crimp clamp 1125 secures fitting 1118 to tubing 1108.

In an example embodiment the bleed valve fitting 1116 is a normally closed valve configured to seal the opposite end of tubing 1108 to prevent any fluid 1106 from escaping once the device 1102 is filled with fluid, but to allow air to escape from the device 1102 when the device is being filled with fluid through the fill/discharge valve 1118. A crimp fastener 1124 is used to secure the fitting 1116 in place on tubing 1108. In an alternative embodiment, bleed valve 1116 on one end of tubing 1108 is replaced with a low loss fitting that is similar or identical to fitting 1118 except that it is made for mating with a different diameter service port such that the device can be used to service AC/R systems that have different size service ports simply by reversing the orientation of the device.

In example embodiments, any of the above delivery systems described above are used to introduce lubricant additive composition 106 to an AC/R system. In at least some embodiments, this occurs during a refrigerant changeover—for example, the existing refrigerant is removed from the AC/R system, and replaced with a HFC refrigerant without changing the existing lubricant in the system. The lubricant additive is then added to the AC/R system using one of the delivery systems described above to condition the existing lubricant so that it functions suitably in the system with the HFC refrigerant. In some example embodiments, a container (such as container 15 or 1104) containing the lubricant additive composition is connected to the AC/R system service port while the system is off to charge the container; the AC/R system is then turned on with the lubricant additive attached to the service port such that the pressure differential between the container and the AC/R system forces the additive into the AC/R system.

Although the above description has focused on adding the lubricant additive to an AC/R system during a changeover to a HFC refrigerant, the lubricant additive can be added at any time to improve miscibility and performance in an AC/R system that contains HFC and a mineral oil lubricant or alkyl benzene lubricant. Accordingly, in some applications, additive compositions as described herein not only improve miscibility of refrigerant and oils but also provides enhanced features to an existing compressor oil with resultant, improved performance and longer life of the AC/R system.

Although many different formulations are possible, in some example embodiments the additive composition consists of 20-40 wt % of triethylorthoformate and 0.5-10 wt % each of selected performance-enhancing additives such as an antioxidant or thermal stabilizer, anticorrosion additive, metal deactivator, acid neutralizer, or antiwear additives in a polyolester lubricant. In example embodiments the polyolester lubricant, which functions as a miscibility agent, consists of a minimum of 50% wt of the additive composition, however in at least some applications a additive composition that contained as little as 30% wt polyolester could provide sufficient performance. The entire additive would be added at the rate of 3-10% of the amount of refrigeration oil in the system.

In a non-limiting example embodiment the lubricant additive contains 28 wt % of triethylorthoformate and 0.9 wt % phenylalphanaphthylamine in ISO 32 grade polyolester lubricant which for example could be added at a rate of 5% of the amount of refrigeration mineral oil in a 48,000 BTU packaged unit (compressor, condensor, evaporator).

The embodiments described herein are intended as examples. Many variations and alterations are possible.

The invention claimed is:

1. A method comprising:
    accessing a container containing a lubricant additive composition comprising a miscibility agent and a hydrolytic agent to improve lubricant miscibility between an HFC refrigerant and a mineral oil lubricant or an alkyl benzene lubricant;
    coupling the container to a service port of an air-conditioning or refrigeration (AC/R) system using a connector configured to couple the container to a service port of the AC/R system; and
    injecting the lubricant additive into the AC/R system, wherein the AC/R system is one that has been converted from use of another refrigerant type to use of an HFC refrigerant, wherein the miscibility agent comprises a polyolester, and the lubricant additive composition contains at least 30 wt % of the polyolester.

2. The method of claim 1, further comprising, prior to the step of injecting:
    removing a non-HFC refrigerant from the AC/R system that contains a mineral oil lubricant or alkyl benzene lubricant; and
    adding an HFC refrigerant to the AC/R system without removing the mineral oil lubricant or alkyl benzene lubricant.

3. The method of claim 1 further wherein: the lubricant additive composition is added independently of the HFC refrigerant into an AC/R system that contains an HFC refrigerant and at least one of the mineral oil lubricant, or the alkyl benzene lubricant.

4. The method of claim 1, wherein the hydrolytic agent comprises triethylorthoformate.

5. The method of claim 4 wherein the triethylorthoformate is between 20 wt % to 40 wt % of the lubricant additive composition.

6. The method of claim 3, comprising, prior to adding the lubricant additive composition:
   removing a non-HFC refrigerant from the AC/R system that contains a mineral oil lubricant or alkyl benzene lubricant;
   adding an HFC refrigerant to the AC/R system without removing the mineral oil lubricant or alkyl benzene lubricant.

7. The method of claim 1, wherein the hydrolytic agent comprises an orthoester, acetal, epoxide or carbodiimide.

8. The method of claim 1 wherein the lubricant additive composition further comprises one or more of a fluorescent dye or a performance enhancing agent including one or more of antioxidant or thermal stabilizer, anticorrosion additive, metal deactivator, acid neutralizer, or antiwear additive.

9. The method of claim 1 wherein the lubricant additive composition further comprises a phenol or phenyl-alphanaphthylamine as an antioxidant or a thermal stabilizer.

10. The method of claim 1 wherein the lubricant additive composition further comprises an alkenyl succinic acid derivative as an anticorrosive.

11. The method of claim 1 wherein the lubricant additive composition further comprises a phosphate ester as an anticorrosive.

12. The method of claim 1 wherein the lubricant additive composition further comprises a metal deactivator additive comprising a tolutriazole.

13. The method of claim 1 wherein the lubricant additive composition further comprises an acid neutralizer comprising one or more of a metal alkoxide, carbodiimide, glycidyl ether, epoxide, alkanolamine, arylamine, overbased metal sulphonate or an inorganic base.

14. The method of claim 1 wherein the lubricant additive composition further comprises an acid neutralizer comprising KOH.

15. The method of claim 1 wherein the lubricant additive composition comprises a further miscibility agent that comprises one or more of an alkylbenzene, polyalphaolefin or polyalkylene glycol refrigeration lubricating oil.

16. The method of claim 1 wherein the additive composition comprises a further miscibility agent comprising one or more of:
   (a) an alcohol, comprising methanol, ethanol, propanol, diol including butanediol or aromatic alcohol including the benzenediol;
   (b) a glycol including glycerol, ethylene glycol, diethylene glycol and propylene glycol;
   (c) an amine;
   (d) an amide; or
   (e) a liquid or gaseous hydrocarbon.

17. The method of claim 1 wherein the container is either (a) vacuum-packed to facilitate additive injection into the AC/R system using system pressure or (b) pressurized with a nitrogen, carbon dioxide or gaseous hydrocarbon to facilitate additive injection into the AC/R system, and the connector includes a hose to facilitate attachment of the container to the AC/R system.

18. The method of claim 1 wherein the container comprises a syringe injector containing the additive composition.

* * * * *